United States Patent
Ross et al.

(10) Patent No.: US 6,942,885 B2
(45) Date of Patent: Sep. 13, 2005

(54) SCORED SAVORY DOUGH WITH TOPPINGS OR FILLINGS

(75) Inventors: Robert E. Ross, Trumbull, CT (US); Gerard J. Loizeau, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/285,652

(22) Filed: Nov. 1, 2002

(65) Prior Publication Data

US 2004/0086601 A1 May 6, 2004

(51) Int. Cl.$^7$ .................................................. A21D 10/00
(52) U.S. Cl. ........................... 426/94; 426/76; 426/128; 426/144; 426/496
(58) Field of Search .......................... 426/128, 76, 94, 426/549, 144, 496

(56) References Cited

U.S. PATENT DOCUMENTS

| | | |
|---|---|---|
| 1,319,899 A | 10/1919 | Rafert |
| 1,646,921 A | 9/1927 | Loose |
| 1,803,711 A | 5/1931 | Bombard et al. |
| 1,836,604 A | 12/1931 | Meyer |
| 1,876,701 A | 9/1932 | Lemmon, Jr. |
| 1,929,358 A | 10/1933 | Keefer ........................... 107/54 |
| 1,952,698 A | 3/1934 | Willem ............................. 31/5 |
| 2,901,352 A | 8/1959 | Strause ........................... 99/92 |
| 3,024,112 A | 3/1962 | Burgess ............................ 99/2 |
| 3,358,379 A | 12/1967 | Coley .............................. 34/5 |
| 3,397,064 A | 8/1968 | Matz .............................. 99/90 |
| 3,677,769 A | 7/1972 | King ............................... 99/86 |
| 3,765,909 A | 10/1973 | Moline ...................... 99/192 R |
| 4,215,104 A | 7/1980 | Ullman et al. ................ 424/15 |
| 4,445,835 A | 5/1984 | Wasserbach ............. 425/131.1 |
| 4,517,209 A | 5/1985 | Thornton et al. ........... 426/383 |
| 4,525,373 A | 6/1985 | Hosaka ....................... 426/634 |
| 4,606,923 A | 8/1986 | Ricke ........................... 426/94 |
| 4,659,582 A | 4/1987 | Puglia et al. ................ 426/549 |
| 4,668,522 A | 5/1987 | Cappel et al. ................. 426/94 |

(Continued)

FOREIGN PATENT DOCUMENTS

| | | |
|---|---|---|
| CA | 1338372 | 6/1996 |
| DE | 94 17 488 | 1/1995 |
| EP | 0031718 | 7/1981 |
| EP | 0 084 210 | 7/1983 |
| EP | 0136158 | 4/1985 |
| EP | 0 145 550 | 6/1985 |
| EP | 0 214 707 | 3/1987 |
| EP | 0 900 527 | 3/1999 |
| EP | 0900527 * | 3/1999 |
| FR | 2669190 A1 | 5/1992 |
| GB | 461263 | 2/1937 |
| GB | 2361403 A | 10/2001 |
| WO | WO 90/01877 | 3/1990 |
| WO | WO 92/10101 | 6/1992 |
| WO | WO 97/31539 | 9/1997 |

(Continued)

OTHER PUBLICATIONS

Riddle, J.S., "Frookies to Offer Cookies to In-Store Departments," Supermarket News, 40(26):40 (1990).

(Continued)

*Primary Examiner*—Lien Tran
(74) *Attorney, Agent, or Firm*—Winston & Strawn LLP

(57) ABSTRACT

A ready-for-use refrigerated or frozen dough that is prepared from flour, a leavening agent, fat; has no greater than 0.5 weight percent sugar or sugar substitute; and preferably includes one or more toppings, fillings, or both. The dough has a surface that includes grooves, score lines, or combinations thereof which define pieces of the dough to be separated into individual bakery products. The grooves, score lines, or combinations thereof each have a depth of about 3% to about 95% of the thickness of the dough. The dough is in the form of a sheet or a parallelepipedal, cylinder, prismatic block or polygon having a thickness of from about 0.5 to 5 cm.

25 Claims, 5 Drawing Sheets

U.S. PATENT DOCUMENTS

| | | | |
|---|---|---|---|
| 4,717,570 A | 1/1988 | Polizzano | 426/94 |
| 4,717,577 A | 1/1988 | Constance et al. | 426/549 |
| 4,762,723 A | 8/1988 | Strong | 426/283 |
| 4,777,057 A | 10/1988 | Sugisawa et al. | 426/412 |
| 4,840,803 A | 6/1989 | Polizzano | 426/94 |
| 4,859,473 A | 8/1989 | Arciszewski et al. | 426/19 |
| 4,888,192 A | 12/1989 | Ramnarine | 426/448 |
| 4,900,577 A | 2/1990 | Arciszewski et al. | 426/563 |
| 4,910,029 A | 3/1990 | Thulin et al. | 426/94 |
| 4,961,941 A | 10/1990 | Cocco et al. | 426/94 |
| 4,961,942 A | 10/1990 | Cocco et al. | 426/94 |
| 5,045,329 A | 9/1991 | Goglanian | 426/106 |
| 5,049,399 A | 9/1991 | Huang et al. | 426/87 |
| 5,171,599 A | 12/1992 | Weber | 426/549 |
| 5,349,759 A | 9/1994 | Anton et al. | 33/524 |
| 5,417,150 A | 5/1995 | Kordic | 99/432 |
| 5,419,903 A | 5/1995 | Evans et al. | 426/144 |
| 5,523,107 A | 6/1996 | Wallin | 426/549 |
| 5,538,744 A | 7/1996 | Miller et al. | 426/94 |
| 5,620,713 A | 4/1997 | Rasmussen | 425/131.1 |
| 5,830,519 A | 11/1998 | Telfer et al. | 426/144 |
| 6,024,997 A | 2/2000 | Blaschke et al. | 426/144 |
| 6,149,960 A * | 11/2000 | Book et al. | 426/551 |
| 6,280,783 B1 | 8/2001 | Blaschke et al. | 426/144 |
| 6,284,295 B1 | 9/2001 | Blaschke et al. | 426/144 |
| 6,312,743 B1 | 11/2001 | Blaschke et al. | 426/144 |
| 6,413,563 B1 | 7/2002 | Blaschke et al. | 426/144 |
| 2002/0110631 A1 | 8/2002 | Blaschke et al. | 426/565 |
| 2003/0035876 A1 * | 2/2003 | Kostival et al. | 426/549 |

FOREIGN PATENT DOCUMENTS

| | | |
|---|---|---|
| WO | WO 98/26666 | 6/1998 |
| WO | WO 99/66802 | 12/1999 |
| WO | WO 00/35291 A1 | 6/2000 |
| WO | WO 01/06858 | 2/2001 |
| WO | WO 02/17728 A2 | 3/2002 |
| WO | WO 03/015525 A2 | 2/2003 |
| WO | WO 03/020043 A1 | 3/2003 |

OTHER PUBLICATIONS

Brochure from Readi–Bake International titled "Gourmet Cookies."

Copy of packaging for "Snap to Bake Cookies" manufactured by Pampas, A Division of Quality Bakers Australia Limited.

Copy of packaging for Holiday Sugar Cookies, manufactured by Pillsbury.

* cited by examiner

SCORED SAVORY DOUGH WITH TOPPINGS OR FILLINGS

FIELD OF INVENTION

The present invention is directed to a ready-for-use refrigerated dough which can be preserved chilled or frozen and which is typically prepared from flour, a leavening agent, a fat, water, optionally sugar, and other ingredients. The dough includes score lines thereon which facilitate breaking the dough into smaller pieces for baking into a final product. In preferred embodiments, the savory dough includes one or more toppings, fillings, or both.

BACKGROUND ART

Ready-made bread products and cookie doughs already exist on the market. Typically, cookie doughs are refrigerated and packaged either in a cylindrical shape or packaged in a cup. During use, the consumer uses a spoon or a knife to form the cookie in a circular shape prior to baking. This particular cookie dough preparation requires extensive manipulation of the cookie dough prior to use. If the cookie dough is packaged in the form of a block or sheet, then a forming device is needed in order to give the cookie the desired circular form. This cookie dough manipulation, however, leaves remnants of cookie dough pieces, which must then be recycled and reshaped if desired.

Another conventional product is a frozen cookie dough which is in the form of individual amounts to form single cookies. The amounts are provided by forming dough balls or by cutting the dough into individual pieces. The balls or pieces are then placed adjacent each other on a tray or other support, and are then frozen. The dough pieces, being tacky before freezing, stick to adjacent pieces and freeze into a solid block. During use, the consumer thaws the block and then separates the individual pieces for baking. As the preparation before freezing is somewhat complex, an improvement on these type products is also needed.

Bread products like pizza crusts are typically formed in one of several ways. One common type of pizza crust product is as a fully formed and frozen pizza crust with toppings disposed thereon. Another conventional pizza crust product is in the form of individual or multiply-packaged pizza crusts that are vacuum packed and stored at room temperature (e.g., Boboli™ shells), again with parmesan or other cheeses disposed thereon. Yet another conventional pizza crust product is available as powder packages of flour and other dry ingredients to which yeast and/or hot water are added by the consumer. Muffins are often found either in fully cooked and ready-to-eat form or in boxes or bags of flour and other dry ingredients, to which oil, water, eggs, or the like must be added by the end-user before cooking. Some rolls and biscuits are available in a form like the cookie dough described above, with sticky pieces that must be pulled apart after removal from a cylindrical pack. For example, crescent-shaped rolls are available in a cylindrical pack as dough triangles with perforations between the dough to be pulled apart, however, these must then be formed into the necessary shape, and the dough tends to be soft for further shape manipulation and thus tends to tear. Such conventional products typically often do not include toppings, fillings, or the like, but these need to be added during preparation by the end user. Many other conventional bread products are available in their individual, pre-cooked form, such as bagels, crackers, or in a form that is ready-to-cook such as pie crust pre-formed into a pie tin.

SUMMARY OF INVENTION

The present invention relates to a consumer-friendly, ready-to-bake refrigerated or frozen dough that requires only a minimum amount of manipulation during use and which advantageously minimizes or eliminates dough pieces that need to be reshaped or recycled. Also, this dough is preformed easily into shapes to assist in the preparation and baking of the product.

The ready-for-use dough can be preserved in the refrigerator or freezer. Typically, this dough is prepared from flour, a leavening agent, and a fat, and optionally sugar. Additionally, the dough is provided in a form ready for baking having grooves, score lines, or a combination thereof which define pieces of dough that are to be separated and baked, or vice versa, into final products, such as one or more of muffins, quick breads, crackers, rolls, biscuits, pie crusts, breads, pizza doughs, bagels, or other bakery products. In some embodiments, it is desired for the grooves, score lines, or other indentations not to extend entirely through the dough.

The invention also relates to a method for providing individually baked products comprising the steps of: providing an uncooked dough sheet or block which has separable portions of predefined shape, separating one or more portions from the sheet or block, and then baking the portions to obtain individually baked products. In another embodiment, the baking occurs first, and one or more portions are separated. In a preferred embodiment, the portions are broken or snapped off from the remaining pieces of the block. Advantageously, the shapes of the portions are defined by grooves, score lines or combinations thereof and the portions are separated from the sheet by breaking them along the grooves or score lines. The grooves or score lines may be intersecting or non-intersecting and substantially straight to define polygonal shaped portions, or at least partially arcuate to define the shape of an object having non-linear features.

The portions may be baked in separate pans which define the final shape and configuration of the individually baked product, or separated portions can be baked in a single pan to facilitate more uniform baking and the portions. Alternatively, the dough may be formulated to flow upon baking and the portions baked on a sheet or pan which allows the portions to flow to form substantially round, individually baked products if desired.

The invention relates to a ready-for-use bakery dough prepared from flour, a leavening agent in an amount from up to about 3% by weight, and fat, with the dough having a thickness and a surface which includes an imprint of grooves, score lines, or combinations thereof which define pieces of the bakery dough to be separated, wherein the grooves, score lines, or combinations thereof each have a depth of about 3% to about 95% of the thickness of the dough, wherein the dough has a sugar and sugar substitute content that is no greater than 0.5 weight percent. In one embodiment, at least some of the pieces have a filling component therein, or topping component thereon, or both. Preferably, the filling or topping includes at least one cheese, sauce, spice, fruit, vegetable, meat, chicken, fish, or a combination thereof, more preferably spices, fruits, vegetables, meat, chicken, fish, or a combination thereof.

One preferred product of the invention includes a bakery dough formed as focaccia bread or bruschetta bread with a topping including tomato and at least one flavor-altering spice. In a preferred embodiment, the filling, topping, or both are at least substantially free of sugar or sugar substitute. The dough pieces can have different sizes and/or shapes, or they can be of identical size and/or shape. In one embodiment, the imprint does not extend entirely through the dough. In one preferred embodiment, the bakery dough is at least substantially free of added sugar or sugar substitute. Preferred bakery dough products according to the invention include muffins, crackers, rolls, biscuits, pie crusts, breads, pizza dough, bagels, or a combination thereof.

The invention also relates to a method of preparing a baked dough product as noted above by baking the ready-for-use bakery dough, and separating apart a plurality of pieces along the grooves, score lines, or combination thereof for consumption. Moreover, the invention also relates to a dough product which includes a ready-for-use bakery dough prepared from flour, a leavening agent in an amount from up to about 3% by weight, and fat, with the dough having a thickness and a surface which includes an imprint of grooves, score lines, or combinations thereof which define pieces of the bakery dough to be separated, wherein the grooves, score lines, or combinations thereof each have a depth of about 3% to about 95% of the thickness of the dough, wherein the dough has a sugar and sugar substitute content that is no greater than 0.5 weight percent, and a set of instructions including an instruction to bake the dough and then separate (i.e., cut, break off, or both) one or more pieces along the grooves, score lines, or combinations thereof. In another embodiment, the set of instructions includes an instruction to separate (i.e., cut, break off, or both) one or more dough pieces along the grooves, score lines, or combinations thereof, and then bake the dough pieces, such as on a bakery sheet or in a bakery tin.

BRIEF DESCRIPTION OF THE DRAWINGS

The remainder of the description is made with reference to the drawings which illustrate preferred embodiments wherein.

DETAILED DESCRIPTION OF THE INVENTION

Figure 1:
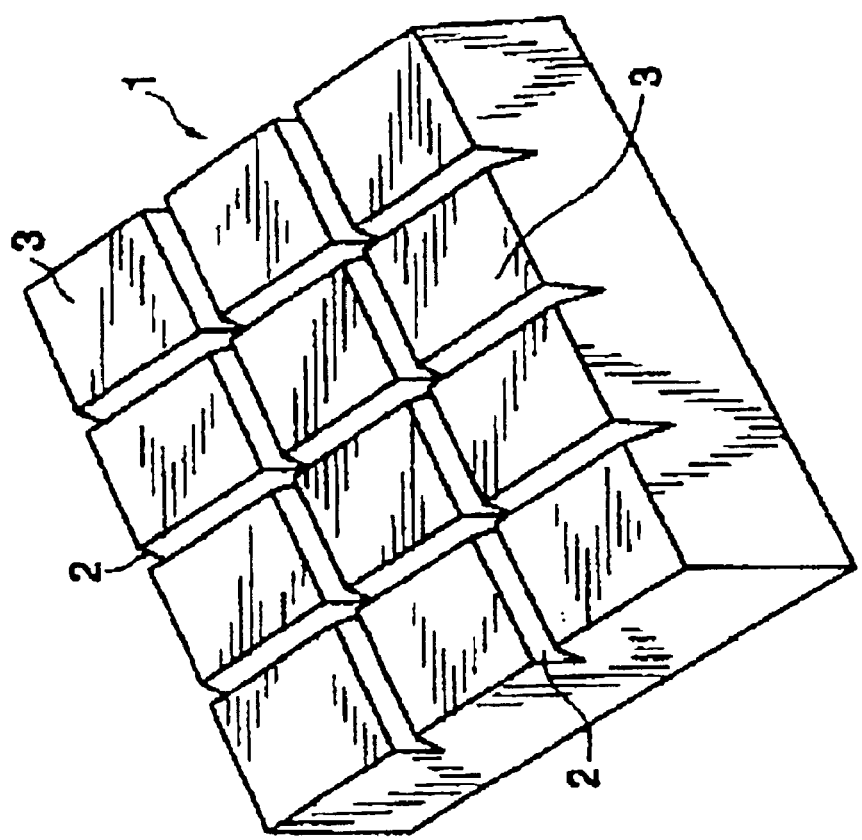
FIG. 1 is a perspective view of a rectangular block of dough prepared with intersecting grooves that define pieces of dough that can be broken off into dough pieces.

The present invention relates to a new form of pre-mixed or pre-prepared bakery dough products which is ready for baking. The term "bakery dough" is used to mean pre-mixed dough of the types used for making bakery items where the dough is provided in the form of a sufficiently solid or semi-solid block and 0.5 weight percent or less of sugar or sugar substitute(s). This block is typically provided under refrigerated or frozen conditions, is purchased that way by the consumer, and then is removed from the refrigerator or freezer, thawed if necessary, and then is separated into pieces which are placed onto a pan or onto a baking tin for baking into the final product. In another preferred embodiment, the dough is baked first and then pieces are separated.

The invention includes a number of different embodiments, one of which is a bakery dough exemplified by a savory bread. In a preferred embodiment, the dough or savory bread of the invention is not a cookie dough. Specific examples of suitable bakery doughs include, but are not limited to, muffins (e.g., jonny cakes, English muffins), crackers (e.g., salted crackers, baked crackers, graham crackers, etc.), rolls (e.g., soft rolls, dinner rolls, crescent rolls), biscuits (e.g., buttermilk biscuits, cobbler biscuits), pie crusts, breads (e.g., focaccia, bruschetta, mixing-for-yeast breads, quick breads, sourdough breads, soda breads, breadsticks, corn bread, etc.), pizza doughs, bagels, and the like, having 0.5 weight percent or less of sugar or sugar substitute(s). In one preferred embodiment, savory doughs of the invention are preferably prepared, scored, optionally stored in a freezer or refrigerator, baked first, and then broken or cut into individual pieces.

The dough product pieces can be baked on a flat pan in an oven, while other dough, such as muffin dough or a cobbler dough, are baked in a baking tin or in individual forms or cups. For instance, the individual forms can be made of baking paper, aluminum foil or a mold or cup of a tray. In the case of pizza dough, for example, the pizza dough pieces can be about ½ inch to 6 inches across to form small pizzas. Bakery dough pieces can be bite-sized for serving to party guests, or larger for a more hearty snack or meal.

The block is broken into smaller pieces along the score lines provided on the body and preferably on its upper surface to provide individual baked items. The dough according to the invention can be provided in any form but the block form is particularly advantageous. This block may be either of parallelepipedal form, or of cylindrical form, or of prismatic form.

The dough according to the invention can have several shapes. Preferably, the dough is shaped into a block or sheet. The block may be either of parallelepipedal shaped, cylindrical shape or prismatic shape. For example, a bread dough having baking powder in an amount from about 0.1% weight percent to about 1.5% weight percent can be easily formed into these shapes. Subsequently, the shaped dough piece is placed on a baking tray and baked. In one embodiment, the dough block is preferably not rolled, as this can cause sticking of rolled dough parts or damage to the grooves and/or score lines during transport or storage thereof. During baking, the dough can flow into a substantially circular shape if desired.

In one embodiment, the dough block has an imprint to facilitate breaking the dough into smaller blocks, pieces or portions. The imprint or precut facilitates breaking the frozen, thawed dough before or after baking. With savory doughs, it is preferred in one embodiment to bake the entire scored and/or grooved block of dough before breaking or cutting the block into pieces. The block of dough with an imprint can be broken or snapped into smaller blocks by using a knife or by hand. When using a knife, the knife completely cuts the block of dough beyond the imprint.

Alternatively, the block of dough can be pulled apart using one's hands. As long as the block of dough has an imprint or a partial cut, the dough blocks can be either cut or broken into smaller size pieces of rectangular, circular, triangular or any other geometric shapes. There is no waste due to shaping and no manipulation, other than cutting or breaking of the dough by the consumer. The imprint or partial cut preferably extends partially through the dough thickness, although in certain situations it can extend throughout the entire thickness. U.S. Pat. No. 6,413,563 has further details to enable one of ordinary skill in the art to determine suitable preferred imprint configurations in accordance with the invention described herein.

The dough typically includes a leavening agent. Any conventional leavening agent can be utilized depending upon the final product and its desired characteristics. One common leavening agent is baking powder, and this is advantageous for preparing dough which flows when baked. This agent at least in part contributes to the ability of the dough pieces to flow into a round bakery product, such as a biscuit or roll, during baking.

As used herein, "baking powder" means a mixture of at least one bicarbonate or carbonate salt, at least one acidifying agent and at least one separating agent. These ingredients and adequate substitutes are commonly known to one of ordinary skill in the art, therefore, any known ingredient or substitute can be used with the invention. Preferably, sodium bicarbonate is used with sodium diphosphate or disodium dihydrogen pyrophosphate and a starch as separating agent. These mixtures are directly available commercially with a fixed composition. Typically, a mixture of baking powder comprises bicarbonate in an amount of about 30%, acid in an amount of about 40%, and a separating agent in an amount of about 30% by weight. In a specific embodiment, sodium bicarbonate may be used alone in an amount of about 0.2% to 0.7%, preferably about 0.5% by weight.

Other conventional leavening agents can be used, including phosphates such as disodium dihydrogen pyrophosphate. These agents are typically used in an amount of about 0.1% to 3% by weight. The amount and type of leavening agent can be selected to provide the dough pieces with the ability to retain their original shape during baking so that square, triangular or other shapes can be substantially retained in the final baked product. For certain products, the leavening agent may be omitted.

The leavening agents may also include one or more yeast strains. Preferred yeast stains include those that remain active when chilled, such as low temperature inactivated ("LTi") yeasts. Suitable LTi yeasts include those described in U.S. Pat. No. 5,776,526, which is incorporated hereby by express reference thereto.

Any type of flour can be used. Typically, the flour can be a cereal flour with a high or low protein content depending on the type of dough and finished product attributes desired. The flour content is normally from about 10% to about 60%, preferably from about 20 to about 40% and more preferably from about 27% to about 37% by weight, although it may be varied if necessary.

The sugar that is optionally used can be of any type. Sugars include, but are not limited to, fructose, sucrose, dextrose, corn syrup, glucose, lactose, galactose, or mixtures thereof. Preferably, sucrose is used, in the form of granulated sugar. To increase dough sweetness, a sugar substitute such as sorbitol, saccharine or any other known sugar substitute can be added either in conjunction with sugar or as a substitute for the sugar, however, the use of sugar is minimized or avoided in the present invention. The sugar or sugar substitute, when used, can be present in an amount of 0.5 weight percent or less, preferably in an amount of less than about 0.3 weight percent, and more preferably about 0.1 weight percent or less. In one preferred embodiment, the sugar is present in an amount of less than about 0.01 weight percent. In one bakery dough embodiment, the dough is completely free of sugar and sugar substitute(s).

The dough should have a moisture content from about 15% to about 50%, preferably from about 30% to about 40% by weight.

The type of fat present has an influence on the flow capacity of the dough during baking. The fat used in the dough composition according to the invention can be a solid or liquid fat at room temperature. The fat can be of animal or plant origin, such as, lard, tallow, butter oil, butter, margarine, corn oil, copra oil, palm oil, sunflower oil, safflower oil, canola oil, soya bean oil, coconut oil, palm kernel oil, cotton oil, peanut oil, olive oil, or mixtures thereof. The fats can be emulsified or stabilized with mono- or diglycerides or other emulsifiers known in the art. For example, margarine, which already contains an emulsifier, can be used. Typically, a fat is present in an amount from about 5% to about 35%, and preferably in an amount from about 10% to about 25% by weight.

Optionally, a texturing agent can be included. One of ordinary skill in the art can determine the appropriate texturing agent with little or no experimentation. A preferred texturing agent is whole egg or egg white, liquid or dried egg powder or any egg substitute. Typically, the texturing agent can be in an amount from about 0.1% to about 10%, and preferably in an amount from about 2% to about 5% by weight.

The dough according to the invention may also contain natural or artificial flavoring agents, including but not limited to, butter flavor, cinnamon, ginger, cocoa powder, fruit flavor, nut flavor (e.g., peanut butter or peanut flour), and the like. These are typically used in an amount of about 0.01% to about 8% by weight, and preferably from 0.25 to 7% by weight. Of course, various combinations of these flavoring agents are possible, as desired. When no sugar or sugar substitute is present in the bakery dough, one preferred embodiment includes one or more flavoring agents.

Optionally, the dough may contain inclusions. Inclusions may, when used, be present in an amount of about 1 to 30 weight percent of the dough product and typically include, but are not limited to, oat flake pieces, raisins, fruit pieces, whole nuts or nut pieces, i.e., groundnuts, hazelnuts or other nuts, caramel, vegetable pieces, spices such as peppercorns or rock salt, or various mixtures thereof. The inclusions can be of any edible size, and are typically from about 1 mm to about 25 mm, preferably from about 4 mm to about 10 mm. The amount of inclusions can vary from about 1 to 30 weight percent. Optionally, dark chocolate, milk chocolate, white chocolate, compound coatings or mixtures thereof may be used in the form of morsels, pellets or chunks. Chocolate can optionally be included in an amount from about 1 weight percent to about 50 weight percent, and preferably in an amount from about 10 weight percent to about 30 weight percent when present. The chocolate can be a commercial chocolate or a chocolate of the type used in pastry making or in catering.

According to the invention, the block or sheet of dough is sufficiently thick to form a bakery dough of edible size upon baking. This feature avoids further dough manipulation either by rolling or folding the dough. Typically, the bakery dough sheet has a thickness of from about 0.5 cm to about 5 cm, and preferably from about 1 cm to about 3 cm.

The block of sheet of dough is cut or broken into smaller pieces prior to baking. Preferably, the block of dough is precut into parallelepipedal blocks from about 1 cm to about 5 cm, preferably from about 3 cm to about 4 cm in size and with a thickness from about 1 cm to about 5 cm, preferably from about 1 cm to about 3 cm. If the dough is shaped into a disk or cylinder, the cylinder typically has a diameter from about 2 cm to about 8 cm, preferably from about 1 cm to about 3 cm. If the block of dough is shaped into a prismatic block, typically, the prismatic block has a thickness from about 1 cm to about 3 cm and a triangle with sides measuring from about 2 cm to about 8 cm, preferably from about 3 cm to about 6 cm.

The dough is prepared and molded and/or partially cut using conventional devices. The sheets or blocks are typically prepared to be broken into predetermined sizes using grooves, or score lines, or a combination thereof to define the shape of the individual portions to be baked. The predetermined size can be any convenient size, however, the size should be sufficiently large to provide a desired baked product. The grooves or score lines are typically made using marker rollers or any other apparatus known to those skilled in the art. Once the block is extruded, it travels along a belt conveyor or similar device, and marker rolls and knives can be used to form grooves as the block of dough passes beneath the rolls and knives. Longitudinal grooves or score lines can be provided by the marker rollers while lateral grooves or score lines are made by knives. The marker rollers and knives can be shaped or configured to match the type of groove or score line desired. For example, a v-shaped knife will provide a v-shaped groove. Optionally, either score lines, grooves, or combinations thereof can be made and one of ordinary skill in the art can configure the marker roller surfaces or knife shape to achieve the desired result. The marker rollers and certain knives can also be configured to cut the extruded dough slab into blocks of the desired size. In a preferred embodiment, the grooves, score lines, or both are of uniform depth, and in another embodiment, they are continuous. In one preferred embodiment, they are both continuous and of uniform depth.

The groove or score line depth should be sufficient to allow the consumer to either break or snap the blocks, as is known with certain types of chocolate bars, or to pull the blocks apart. A knife can be used to cut along the grooves or score lines, although this is not necessary. For a dough thickness of 3 cm, the depth of the grooves or score lines would typically be from about 1 mm to about 20 mm, and preferably from about 5 mm to about 15 mm. When grooves are present, a width of from about 1 mm to about 10 mm, preferably from about 3 mm to about 7 mm is used. When using a combination of grooves and score lines, the groove typically has a depth of from about 7 mm to about 12.5 mm and the depth of the score line is from about 12.5 mm to about 8 mm. Preferably, the groove is from about 5 mm to about 10 mm wide, and the score line is from about 1 mm to about 3 mm wide. In a preferred combination for a 3 cm thick dough block, the width of the groove is about 8 mm, the width of the score line is from about 2 mm, the depth of the groove is from about 10 mm and the depth of the score line is about 10 mm.

Alternatively, the depth and width of the grooves or score lines may be defined as a ratio or percentage of the block thickness. The groove or score line depth is generally from about 3% to about 95%, preferably from about 50% to about 75% of the block thickness. For certain dough products, the groove or score line depth should be about 75% of the thickness of the dough. The groove or score line width is generally about 0.5% to 50%, preferably from about 1% to about 35%, and even more preferably from about 5% to about 25% of the dough thickness. When using a combination of grooves and score lines, the depth of the grooves may be from about 5% to about 50% and the depth of the score lines from about 50% to about 25% of the block thickness. Preferably, the width of the groove is from about 10% to about 40% and the width of the score line is from about 10% to about 20% of the block thickness. As noted above, the grooves, score lines, or combinations do not cut through the entire thickness of the dough. Ratios or percentages for the depth and width of the grooves or score lines may also be calculated directly from the above-described depth and width measurements.

Advantageously, the grooves are provided in a V-like shape, a straight vertical cut which is essentially perpendicular to the dough surface, or a combination of these. Other configurations such as U-shaped, rounded or rectangular grooves, can also be used if desired. The combination of grooves and score lines is particularly useful when the block of dough is made from a soft dough. Softer doughs are typically of a creamy texture and higher in moisture content. The soft dough is generally used for soft type breads, rolls, muffins, pizza doughs, and bagels, and care must be taken to ensure that the pieces can be properly separated without significant sticking or breakage of the dough pieces.

As the top surface of the extruded dough slab is typically not perfectly smooth, the depth and width of each groove and/or score line are often not identical. Also, inclusions such as chocolate chips or nuts can affect the uniformity of the dimensions of the grooves or score lines. For these reasons, the values and ratios mentioned above are considered as averages.

After preparation of the grooves or score lines, and during use of the product by the consumer, individual pieces of dough can be broken off one by one, placed on a tray, and then baked in an oven, or the block can be baked and then the pieces can be broken off one by one or in larger sizes along the grooves and/or score lines. As a practical embodiment, the dough thickness may be about 2 cm for 3.5 cm×3.5 cm blocks. For a 300 g block, there would be 3×3 blocks, for a block of 400 g, 3×4 blocks and for a 500 g block 3×5 blocks. Once the smaller blocks are separated, they are arranged on an oven tray and baked. One of ordinary skill in the art with little or no experimentation can determine the appropriate baking conditions for the type of product to be made and the oven being used. For a bread or pizza dough, baking can be carried out using a conventional oven at a temperature from about 180° C. to about 200° C. for about 12 minutes to about 18 minutes, although this may vary depending on the type and amount of fillings and toppings present in and on the dough. After baking, dough pieces having a diameter of about 7 cm can be obtained from starting blocks of 3.5 cm×3.5 cm, although this will vary according to many factors. According to the invention, the dough can form substantially round articles from blocks which are substantially square shaped.

FIG. 1 illustrates a block of dough formed into a parallelepipedal shape (1) using conventional methods. Thereafter, marker rolls and knives form intersecting grooves (2) on the surface to define blocks of dough (3). The blocks of dough are then pulled apart, placed on a baking sheet, and baked in an oven to form dough products as desired according to the invention. Alternatively, in the embodiment show this figure and in all other embodiments, including those of the figures below, the baking can occur before separation of the pieces.

Figure 2C:
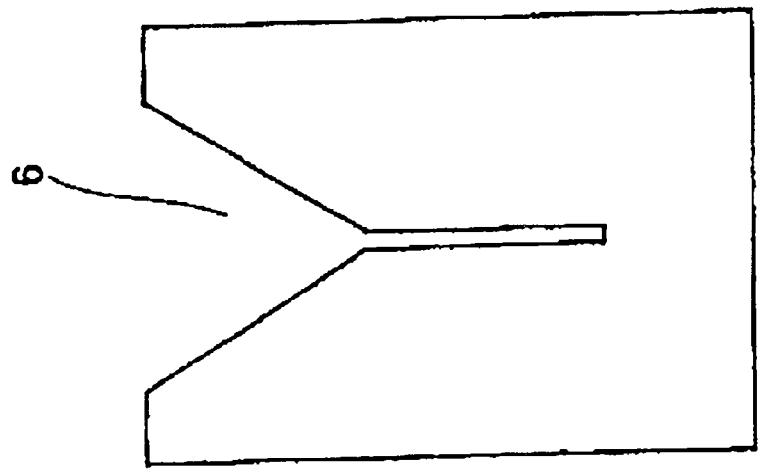
FIGS. 2a, 2b and 2c are enlarged cross-sectional views of a dough block having score lines (2a), grooves (2b) and combinations thereof (2c)
Figure 2B:
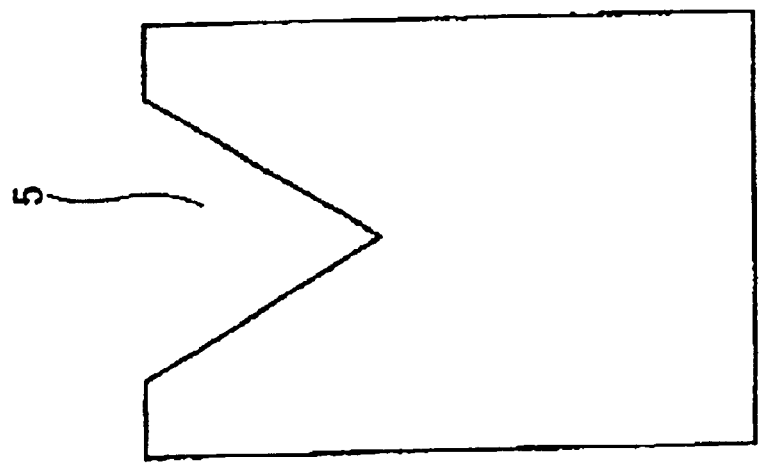
Figure 2A:
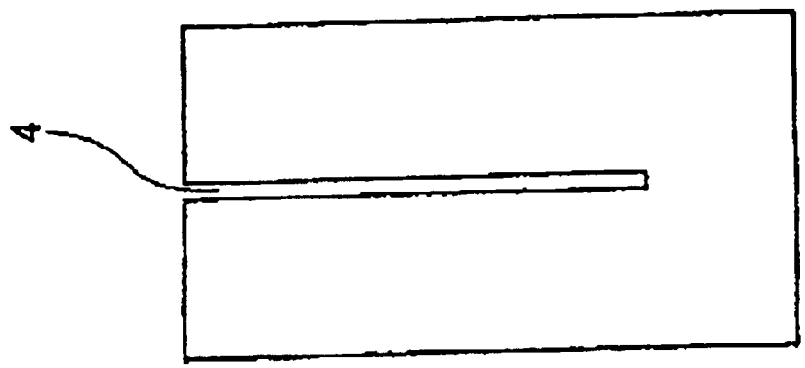

FIG. 2 is a cross sectional view of a score line (4) with a depth of about 75% and a width of about 5% of the thickness of the block of dough (FIG. 2a), a groove (5) with a depth of about 30% and a width of from about 35% to about 5% of the thickness of the block of dough (FIG. 2b), and a combination (6) wherein the groove has a depth of about 30% and a width of from about 35% to about 5% of the thickness of the block of dough and the score line has a depth of about 40% and a width of about 5% of the thickness of the block of dough (FIG. 2c).

The invention also relates to a ready-to-use bakery dough product in the form of a sheet or block which exhibits one or more of the following features:

a) at least two different layers;
b) at least two different strips for each piece taken from the block;
c) the same or a different stamping on the top of each piece;
d) the same or a different decoration on the top of each piece;
e) a filling which is different from the basic dough and is the same or different in each piece, or
f) precut forms of different specific shapes or sizes.

Figure 3:
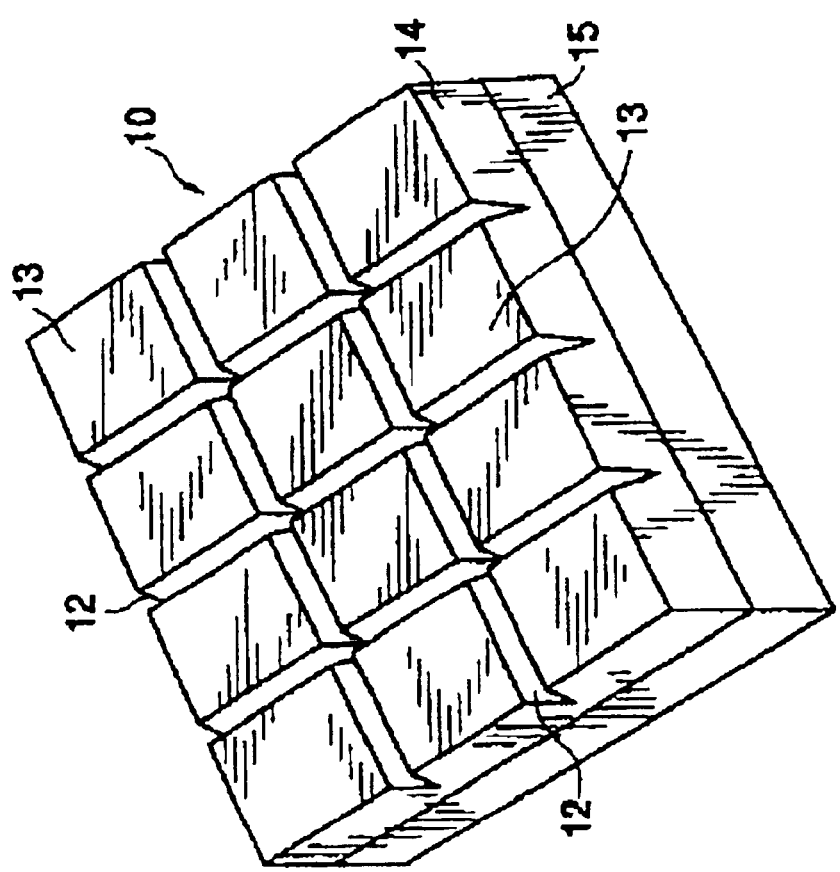
FIG. 3 is a perspective view of a bakery dough block having multiple layers in accordance with another embodiment of the invention.
Figure 4:
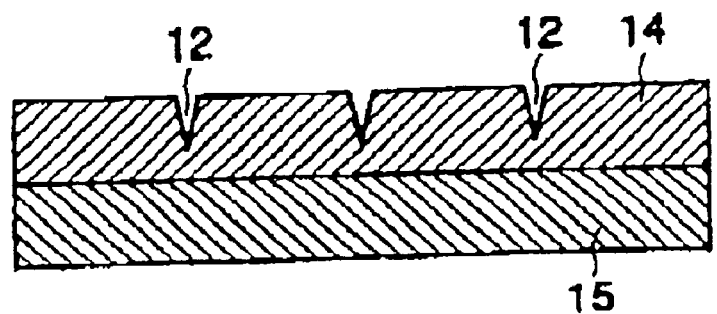
FIG. 4 is a cross sectional view of the bakery dough block of FIG. 3, viewed in a perpendicular direction to the longitudinal axis of the block.

According to one embodiment of the invention, as depicted in FIGS. 3 and 4, the block has at least two different layers. FIGS. 3 and 4 illustrate a multi-layer block of dough formed into a parallelepipedal shape (10) using conventional methods. Thereafter, marker rolls and knives form intersecting grooves (12) on the surface to define blocks of dough (13). The number of layers is not critical but, from a practical point of view, is typically from 2 to 6. Preferably, there are two layers 14, 15 as depicted in FIGS. 3 and 4. These layers 13, 14 are more specifically made of different compositions in all preferred embodiments. This can be done, for example, by adding to the basic dough different types of flavors or colors, which are accepted in the food area. For example, it is possible to have the basic dough as a first layer and dough added with cocoa or other food coloring as the second layer, wherein the resultant dough product has both a clear face and a dark face. The way for producing this layered dough can be either by extrusion, sheeting or by other ways which are known in the art. The blocks of dough are then pulled apart, placed on a baking sheet, and baked in an oven to form dough products as desired according to the invention.

According to another embodiment of the invention, the block has at least two different strips for each smaller piece that is taken from the block. This number of strips is not critical, but typically would be between 2 and 6. Preferably, the number of strips is 4. If desired, these dough strips may be of different compositions. This can be done for example by adding to the basic dough different types of acceptable food grade flavors or colors. For example, it is possible to have the basic dough as first strip and a dough that contains food coloring as a second strip. The resultant dough could then have a clear portion and a dark portion. The way for producing multiple dough strips can be the same as for the layers, i.e., by extrusion, sheeting or other ways that are known in the art. Also, the strips can be placed in adjacent relation either horizontally or vertically in the dough block. Also, two different color doughs which are swirled together to provide a marbled appearance.

According to another embodiment of the invention, each piece of the dough block is stamped on the top with a recognizable design or image, for example, a geometric shape. In this case, a known stamping device is used for creating an indentation on the top of the pieces. The dough can be a classical dough in its composition since the ornamentation is visible on the top face of the bread or other dough product.

According to yet another embodiment of the invention, each piece of the block receives a decoration on the top face. This decoration can be either precisely placed or randomly put on the tops of the pieces of the block. The possible decorations are seeds, for example, sesame seeds, spices, nuts, vegetable pieces such as sun dried tomatoes, or other decorations. The way to put the decoration on the top of the pieces can be either by a sprinkling device or by manual, robotic or mechanical means, all of which are known generally in the art.

According to another embodiment of the invention, the block of dough has a filling for each piece, which filling is different from the basic dough. This filling could be either a creamy or a liquid filling, or even pasty in viscosity. This filling can be savory such as cheese or tomato-based, or a sugar-based confection such as caramel, chocolate, or a fruit or cream gel or viscous fluid. The filling can be also a solid filling, such as chocolate, a flavored dough or another aromatized dough. In the case of a liquid filling, it is so calculated that the filling remains inside the basic dough after cooking. The amount of the filling is not critical; it can represent from about 5 to 50% of the piece of dough. The shape of the filling is also not critical. In addition, it is possible for the dough to break during baking so that the filling can exude onto the baked dough. If possible, the dough is thinner at the top compared to the sides to permit the filling to break through on top, rather than on the sides or bottom where the filling is more likely to char on the baking surface. The way of producing a block with filling includes by coextrusion, by injection, or by placing the filling on a first dough layer and then putting a second dough layer upon the filling and first dough layer, in a manner similar to the way that ravioli is made.

Other possible fillings include fruit jams, sugars, puddings, ice cream, soft candy formulations, chewing gum, marshmallow, and the like. The filling may include one or more cheeses, sauces, spices including savory spices, fruits, vegetables, meat, chicken, fish, and the like, or combinations thereof. One or more spices, fruits, vegetables, or combinations thereof, are particularly preferred in or on certain types of bakery doughs according to the invention. For example, these fillings could be used as a topping over the bakery dough product, such as cheese, garlic, and/or tomato with basil on bruschetta or focaccia bread, although care should be taken so that toppings have minimized contact with the cooking surface, which can cause unsightly charring or a burned flavor or sensation in the baked dough product. In one embodiment, preferred fillings and/or toppings include one or more of: cheese, tomato, basil, bechamel sauce, ham, garlic powder, roasted garlic, chives, salsa, sausage, and gravy. A list of preferred filling and/or topping combinations includes: tomato and basil, bechamel sauce and ham, garlic and chives, roasted garlic and tomato, cheese and salsa, and sausage and gravy. Any of suitable fillings can be used in combination for a suitable filling, e.g., caramel and chocolate, and one or more sweet and non-sweet fillings can even be used separately or in combination with each other.

The filling can be substantially free or even completely free of added sugar. In one embodiment, a bakery dough formulation is used that is substantially free or completely free of added sugar. In one preferred embodiment, the added sugar content in the filling is less than about 5 weight percent, preferably less than about 0.5 weight percent, while in another the added sugar in the filling is less than about 0.25 weight percent of the filling.

According to FIGS. 3 and 4, the block (10) of dough is prepared with the composition stated in Example 5. The preparation is made by sheeting and when the block is formed, marker rolls which make it possible to form the grooves (12) are made to pass over it. At the time of use, it is sufficient to break off one by one, the various pieces or dice (13) that are formed, either before or after they are placed on a tray and put in the oven for baking. If desired, the dice (13) that are formed with two layers: the top layer (14) made with a classical dough and the lower layer (15) made with the same dough but with the addition of cocoa or another coloring agent.

Figure 5:
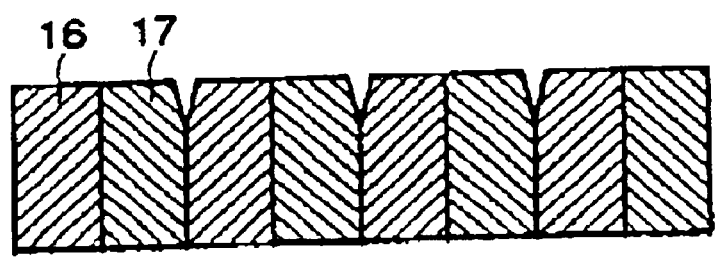
FIGS. 5 and 6 are cross-sectional views of additional embodiments of bakery dough blocks of the invention, to illustrate the use of multiple strips of fillings.

FIG. 5 illustrates a dough section having two strips (16) and (17) of different dough compositions. The dice, which has been broken from the block has these both strips (16) and (17). For example, one strip (6) may be the classical dough as before while the other strip (17) is the same dough, but with cocoa or another coloring agent. In these Figures, different strips or layers can include different amounts or types of inclusions or fillings. This can be used for different visual appearance, different texture, or other reasons, to provide a suitable product.

Figure 6:
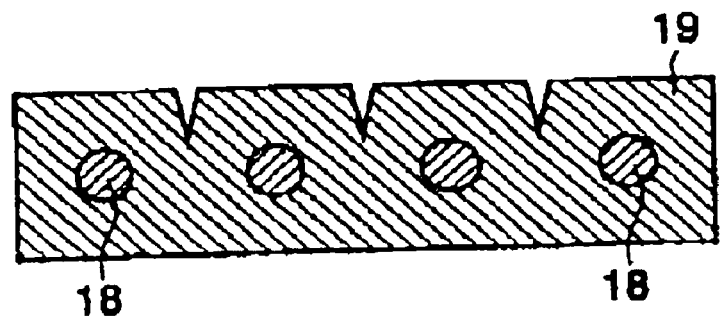

Another embodiment of the invention is shown in FIG. 6, which illustrates a section through the middle of the dice. In this case, there is a filling (18) embedded in the dough (19). The filling must be capable of withstanding the baking process. Typical fillings include a cheese, tomato, fruit jam, or chocolate, or hazel nut or a mixture of chocolate and hazel nut. The ratio of dough to filling is not critical: this ratio is normally between about 30/70 and 85/15 and preferably is from 40/60 and 60/40.

Figure 7:
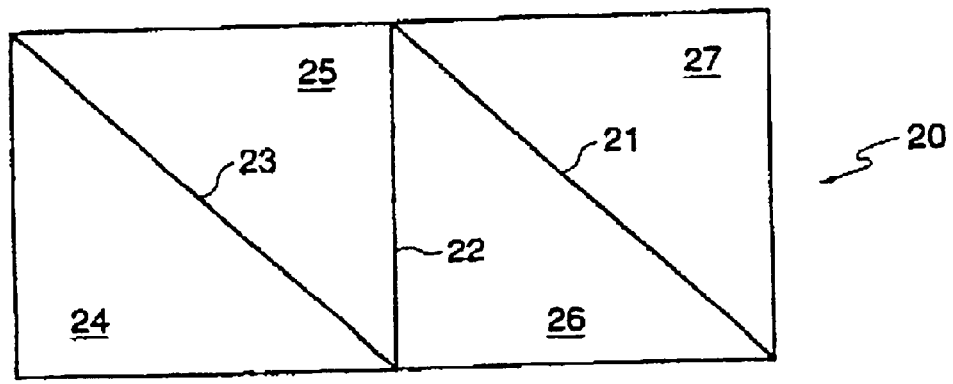
FIG. 7 is a top view of a dough sheet having score lines which, with the edges of the sheet, define triangular dough pieces that can be separated.

Additional embodiments of the invention relate to a sheet of dough. After preparing the sheet in a desired size, such as 4"×8" and ⅛" thick, the sheet is provided with non-intersecting score lines that define the final product to be baked. One embodiment, is illustrated in FIG. 7, where the dough sheet (20) is provided with score lines (21), (22), (23), to define four triangular dough pieces (24), (25), (26), (27), that can be broken off, folded or rolled into a final shape and then baked, or vice versa. Before rolling, a filling can be provided, if desired. According to yet another embodiment of the invention, the dough sheet has nested forms of different specific shapes or sizes. Thus, different shapes or sizes can be provided on the same sheet without having to recycle or reuse any part of the dough. For example, it is possible to have geometric shapes, like triangles, squares, rectangles, or any other shapes. Advantageously, these shapes are nested or otherwise interlaced to efficiently use as much of the sheet as possible. Preferably, the entire dough sheet is divided into the shapes without any waste.

Figure 8:
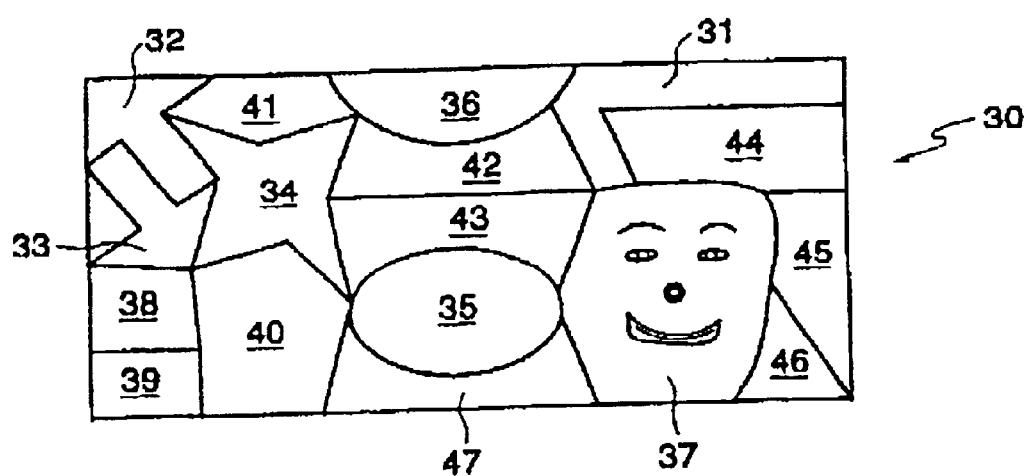
FIG. 8 is a top view of another dough sheet wherein the score lines define various geometric shapes that can be separated from the sheet.

This embodiment is illustrated in FIG. 8, wherein the dough sheet (30) includes a number of different shapes of figures, geometric forms, toy characters, etc., outlined by score lines. These shapes includes a letter (31), arrows (32), (33), a star (34), an oval (35), a half circle (36), a face (37), and other random shapes (38), (39), (40), (41), (42), (43), (44), (45), (46), (47). The shapes are separated, such as by cutting or breaking them off from the sheet along the score lines to form the individual portions for baking. These portions are then placed on a pan and baked as described above, or the block is baked and then the portions separated. The dough can be formulated to retain its shape rather than to flow into a round shape during the baking process, thus retaining the shape of the figure in the final baked product.

The nested configuration of the shapes conserves dough and avoids wasting or resizing dough pieces, e.g., those that could be left over after using a shaped cutter on a dough sheet.

For bread dough preparation, the entire grooved block may be baked in a pan of, for example, approximately double the size: for example, for a rectangle of around 11×14 cm, it is possible to use a square baking of 20×20 cm to account for dough expansion during cooking. The block is broken into defined pieces which are then distributed in the tray in a configuration where they are individually spaced apart from each other so that at the end of the baking, the pieces have joined together due to the rising and flowing effects, but the lines of separation practical for cutting into portions remain visible. Generally, the dough blocks are sized to fit in conventional baking pans. Various pan sizes can be used as long as the number of pieces is adapted to the pan dimensions. After the block is optionally broken into pieces and placed in the pan, it is ready for baking under conventional conditions, such as at a temperature of about 175° C. for 20 to 40 minutes. After baking, the final product is cooked correctly. Also, the baked product may include lines where the pieces optionally previously separated have joined together. The consumer can cut or break the baked product along these lines to form individual servings.

In an alternative of the invention, the grooved block is separated into a plurality of individually predetermined pieces, which are then individually positioned in individual forms, recesses or containers. These forms, recesses or containers are sized so as to leave sufficient room to enable each individual piece to rise and bake properly. This method is more directed to the preparation of small round bakery dough products, e.g., muffins or cupcakes. The pieces that are broken off or separated from a block of dough can be baked in separate pans or in pans having separate compartments (i.e., muffin or cupcake pan). The compartments assist in forming the desired final size, configuration and shape of the bakery product, while providing the dough in sheet form with score lines to define the individual pieces enables the user to quickly dispense the dough pieces into the pan compartments. Of course, in another embodiment, the dough can be baked first before the pieces are separated.

The dough sheet may be provided with a topping either before or after the score lines are made. Typical toppings also include sugar powder or granules, spices, non-pariels, nuts, chocolate or fruit pieces, materials that turn into a glaze during baking, flavoring agents, toffee, caramel or the like. For example, suitable spices include basil, fennel, chives, bay leaves, or the like. Any toppings disclosed herein can be used on the bakery dough of the invention, although some are more suitable for certain dough products than others as will be readily determined by one of ordinary skill in the art. The final product specifics are limited only by the imagination of the bakery product designer or formulator with reference to the description of the invention herein.

The top surface of the dough pieces may also be provided with raised or indented portions that create a shape or figure. If desired, different colors can be provided on the raised surfaces in a manner that is generally known in the dough processing art.

When fillings are provided in the dough, it is contemplated that non-dough fillings can be used. This would include ingredients, such as sugars, chocolates, puddings, ice cream, soft candy formulations, chewing gum, or the like, as well as the other fillings discussed herein. If desired, the filling can be provided between two dough sheets. The filling can be continuous or placed only on or in the individual dough pieces. Any of the other fillings discussed herein can be used. It is also possible to remove part of the top dough sheet or use a top dough sheet with holes so that the filling is exposed. The holes of the top dough sheet can also be provided with a desired shape or figure. Thus, a wide variety of different bakery product arrangements can be provided.

The dough may be packaged in any one of a variety of ways. The block of dough can be wrapped and packaged using conventional methods. The wrapping should protect the dough from air and moisture. Typically, the wrapping is made of synthetic material or based on a cardboard or paper carton. Optionally, the dough can be frozen either prior to or after packaging. Thereafter, the dough can be stored either in a refrigerator or a freezer. By way of example, the shelf life of the dough in a refrigerator is typically about one month, and about six to nine months in a typical freezer. In one embodiment, refrigeration is preferred as the dough can be removed from the refrigerator, and then baked into the final bakery product in a quick and efficient manner, optionally with the dough being broken into pieces before or after baking. In another embodiment, frozen dough products are preferred, particularly where the indentation is through a majority of the dough to facilitate breaking the dough into pieces and placed on a baking sheet or in a baking tin even when the dough is frozen. This can be especially helpful with certain bakery dough products, which tend to be frozen out of the need for a longer shelf life compared to certain types of dough products like muffins that tend to be rapidly consumed. Baking directions can be modified accordingly when the dough is still frozen when placed on or in the desired baking surface. With savory doughs, it is often preferred to place the entire block on a baking sheet or in a baking tin to permit the whole mass to be baked before breaking or cutting the block into pieces.

Also, dough sheets can be individually wrapped, or a plurality, typically between 2 and 4 sheets, can be stacked on paper or cardboard sheets before being packaged. When thin dough sheets (i.e., less than about 3 mm) are used, they may be rolled into cylinders of about 75 mm in diameter before being packaged in a round, square, rectangular or triangular container or box. This conserves space and allows for more convenient packaging and shipping of the products. For this embodiment, the consumer simply removes the rolled sheets from the container, and flattens them before separating the pieces from the sheet. When rolled frozen dough sheets or blocks are provided, the dough is allowed to thaw before attempts are made to flatten it The dough can be packaged with instructions, such as to bake a bakery dough block first and then to separate the number of pieces desired. These instructions can take any suitable form, including a label attached to the packaging; a label or insert disposed inside the sealed package with the dough, optionally separately packaged to minimize moisture damage to the instructions; packaging with the instructions printed or otherwise applied directly thereon; or the like. The instructions can also include one or more of other relevant storage details, cooking information, serving size, governmentally-required ingredient labeling, or the like, each of which will be readily determined by one of ordinary skill in the art understanding that these depend on the specific dough product to which the instructions are affixed.

The term "about," as used herein, should generally be understood to refer to both numbers in a range of numerals. Moreover, all numerical ranges herein should be understood to include each whole integer within the range, as well as the endpoint.

The term "substantially," as used herein to refer to values, generally refers to at least about 90 percent, preferably about 95 percent, of the value. In a preferred embodiment, it refers to at least about 98 percent. For example, when it is stated that the dough product is "substantially free" from inclusions, this means that it contains less than 10%, and preferably less than 5%, and more preferably less than 2% inclusions unless otherwise noted. For sugar or substitutes thereof, the term "substantially free" means no more than about 0.5 weight percent, preferably no more than about 0.1 weight percent. In a preferred embodiment, it refers to no more than about 0.05 weight percent. The term "substantially," as used herein to refer to shapes, indicates that the shape is at least similar to a stated shape, but is not exactly the recited shape. For example, when a shape is substantially triangular, the corners may be rounded or the shape may be slightly flattened. Thus, the shape at least resembles the indicated shape, but is not necessarily exactly the indicated shape.

EXAMPLES

The remainder of the description is made with reference to the following Examples.

Examples 1–2

Bakery Dough Breads According to the Invention

The various ingredients stated in the table below are mixed. The proportions are in percentages by weight.

|  | EXAMPLES | |
| --- | --- | --- |
|  | 1 | 2 |
| Sugar | 2 | 1 |
| Whole Egg | — | 1 |
| Baking Powder or Yeast | 1 | 1 |
| Salt | 0.5 | 0.5 |
| Fat | 1.5 | 1.5 |
| Water | 30 | 30 |
| Flavorings | — | — |
| Flour | 65 | 65 |

The dough is scored or grooved during preparation, and then stored for up to one month in the refrigerator or six to nine months in a freezer. Suitable sized blocks are then broken off along the score lines or grooves, and baked for an appropriate time and temperature to provide baked bread pieces according to the invention.

Example 3

Corn Bread and Cheese and Salsa Filling According to the Invention

A dough using a suitable corn bread formulation was prepared with cheese and salsa provided as a filling. The dough was scored in a 4×5 grid and stored under chilled conditions. Suitable sized blocks were baked for a sufficient time and temperature and then broken off along the score lines to provide baked corn bread pieces of approximately 1 to 1.5 inches per side and approximately 0.5 to 1 inch in height and having a cheese and salsa filling according to the invention.

Example 4

Biscuit with Sausage and Gravy Filling According to the Invention

A biscuit dough was prepared with sausage and gravy filling. The dough was scored in a 2×2 grid and stored under chilled conditions. Suitable sized blocks were baked for a sufficient time and temperature and then broken off along the score lines to provide baked biscuit pieces of approximately 1.5 to 2.5 inches across, 2.5 to 3.5 inches in length, and approximately 0.5 to 1 inch in height having a sausage and gravy filling according to the invention.

Example 5

Puff Pastry with Cypress Tomato Basil Spread Filling of the Invention

A dough using a suitable puff pastry formulation was prepared with cypress tomato and basil spread filling. The dough was scored in a 4×5 grid having a total size of about 8 to 15 cm on each side and stored under chilled conditions. Suitable sized blocks were baked for a sufficient time and temperature and then broken off along the score lines to provide baked puff pastry pieces of approximately 0.75 inches to 1.5 inches per side and approximately 0.5 to 2 inches in height having a cypress tomato and basil spread filling according to the invention.

Example 6

Croissant with Bechamel Sauce and Ham Filling of the Invention

A dough using a suitable croissant formulation was prepared with bechamel sauce and ham filling. The dough was scored in a 4×5 grid having a total size of about 8 to 15 cm on each side and stored under chilled conditions. Suitable sized blocks were then baked for a sufficient time and temperature then broken off along the score lines to provide baked croissant pieces of approximately 0.75 inches to 1.5 inches per side and approximately 0.5 to 1.5 inches in height having a bechamel sauce and ham filling according to the invention.

Example 7

Focaccia Bread with Roasted Garlic and Tomato Filling of the Invention

A dough using a suitable focaccia bread formulation was prepared with garlic and tomato filling. The dough was scored in a 4×5 grid and stored under chilled conditions. Suitable sized blocks were baked for a sufficient time and temperature then broken off along the score lines to provide baked focaccia bread pieces having a roasted garlic and tomato filling according to the invention. Basil and or fennel can optionally be included as a topping, preferably before baking.

Example 8

Filo Dough with Garlic and Chive Spread Filling of the Invention

A filo dough formulation was prepared with garlic and chive spread filling. A rectangular piece of dough was scored in a pattern having 8 triangular pieces and stored under chilled conditions. Suitable sized triangular blocks were baked for a sufficient time and temperature then broken off along the score lines to provide baked filo dough pieces having a garlic and chive spread filling according to the invention. Optionally, cheese, shredded spinach, or both can be included in the filling spread.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention. It will be understood that the chemical and/or mechanical details of every design may be slightly different or modified by one of ordinary skill in the art without departing from the teachings of the present invention.

What is claimed is:

1. A refrigerated or frozen, ready-to-bake bakery dough prepared from flour, a leavening agent in an amount up to about 3% by weight, and fat, with the dough having a thickness and a surface which includes an imprint of grooves, score lines, or combinations thereof which define pieces of the bakery dough to be separated, wherein the grooves, score lines, or combinations thereof each have a depth of about 3% to about 95% of the thickness of the dough, wherein the dough has a sugar and sugar substitute content that is no greater than 0.5 weight percent, and wherein a plurality of the bakery dough pieces have a filling component completely enclosed therein.

2. The ready-to-bake bakery dough of claim 1, wherein the grooves, score lines, or combinations thereof have a depth of from about 5% to about 75% of the thickness of the dough.

3. The ready-to-bake bakery dough of claim 1, in the form of a parallelepipedal, cylinder, prismatic block or polygon having a thickness of from about 0.5 to 5 cm.

4. The ready-to-bake bakery dough of claim 1, wherein the grooves have a width of between about 0.5 to about 50% of the thickness of the dough.

5. The ready-to-bake bakery dough of claim 1, wherein combined grooves and score lines are present.

6. The ready-to-bake bakery dough of claim 1, in the form of a flat circular or polygonal sheet having a thickness from about 1 cm to about 3 cm.

7. The ready-to-bake bakery dough of claim 1, wherein the flour is present in an amount from about 50% to about 80% by weight, the leavening agent is present in an amount of about 0.5 to 3% by weight, and the fat is present in an amount from about 0.5% up to 5% by weight, with a texturizing agent is present in an amount up to about 10% by weight, and a flavoring agent is present in an amount of up to 8% by weight.

8. The ready-to-bake bakery dough of claim 7, wherein the texturing agent comprises egg or egg white and is present in an amount of about 0.1% to about 10% by weight, the flavoring agent is present in an amount of about 0.25% to 7% by weight, the fat is a solid, semi-solid or liquid at room temperature and of animal or plant origin, and the dough has a moisture content of from about 15 to about 50%.

9. The ready-to-bake bakery dough of claim 7, wherein the leavening agent is baking powder or baking soda.

10. The ready-to-bake bakery dough of claim 1, in the form of a block having at least one of: at least two different dough layers; at least two different dough strips; at least some of the pieces have different colors; or at least two different doughs swirled together.

11. The dough of claim 1, wherein at least some of the pieces have a topping component thereon.

12. The ready-to-bake bakery dough of claim 11, wherein at least one of the topping components comprises at least one cheese, sauce, spice, fruit, vegetable, meat, chicken, fish, or a combination thereof.

13. The ready-to-bake bakery dough of claim 12, wherein the filling, topping, or both are spices, fruits, vegetables, meat, chicken, fish, or a combination thereof.

14. The ready-to-bake bakery dough of claim 11, wherein the bakery dough is focaccia bread or brusehetta bread and the topping, filling, or both comprises tomato and at least one flavor-altering spice.

15. The ready-to-bake bakery dough of claim 11, wherein the filling, topping, or both are at least substantially free of sugar or sugar substitute.

16. The ready-to-bake bakery dough of claim 1, wherein the pieces have different sizes or shapes.

17. The ready-to-bake bakery dough of claim 1, wherein the imprint of grooves, score lines or combinations thereof intersect to define the dough pieces that are to be baked and then separated and wherein the imprint does not extend entirely through the dough.

18. The ready-to-bake bakery dough of claim 1, wherein the grooves are V-shaped, U-shaped, rounded or rectangular in shape.

19. The ready-to-bake bakery dough of claim 1 wherein the grooves, score lines or combinations thereof define pieces of dough which are substantially equal in size.

20. The ready-to-bake bakery dough of claim 1, wherein the bakery dough is at least substantially free of added sugar or sugar substitute.

21. The ready-to-bake bakery dough of claim 1, wherein the bakery dough is muffins, crackers, rolls, biscuits, pie crusts, breads, pizza dough, bagels, or a combination thereof.

22. The ready-to-bake bakery dough of claim 1, wherein the bakery dough is frozen.

23. A method of preparing a baked dough product which comprises:

baking the ready-to-bake bakery dough of claim 1; and cutting or breaking apart a plurality of pieces along the grooves, score lines, or combination thereof for consumption.

24. A bakery dough product which comprises:

a refrigerated or frozen, ready-to-bake bakery dough prepared from flour, a leavening agent in an amount up to about 3% by weight, and fat, with the dough having a thickness and a surface which includes an imprint of grooves, score lines, or combinations thereof which define pieces of the bakery dough to be separated, wherein the grooves, score lines, or combinations thereof each have a depth of about 3% to about 95% of the thickness of the dough, wherein the dough has a sugar and sugar substitute content that is no greater than 0.5 weight percent, and wherein a plurality of the bakery dough pieces have a filling component completely enclosed therein; and a set of instructions comprising an instruction to bake the dough and then separate one or more pieces along the grooves, score lines, or combinations thereof.

25. A bakery dough product which comprises:

a refrigerated or frozen, ready-to-bake bakery dough prepared from flour, a leavening agent in an amount up to about 3% by weight, and fat, with the dough having a thickness and a surface which includes an imprint of grooves, score lines, or combinations thereof which define pieces of the bakery dough to be separated, wherein the grooves, score lines, or combinations thereof each have a depth of about 3% to about 95% of the thickness of the dough, wherein the dough has a sugar and sugar substitute content that is no greater than 0.5 weight percent, and wherein a plurality of the bakery dough pieces have a filling component completely enclosed therein; and a set of instructions comprising an instruction to separate a plurality of dough pieces along the grooves, score lines, or combinations thereof and then bake the dough pieces.

* * * * *